No. 689,265. Patented Dec. 17, 1901.
C. G. WIELAND.
MACHINE FOR PAINTING BARRELS.
(Application filed Sept. 13, 1901.)
(No Model.) 3 Sheets—Sheet 1.
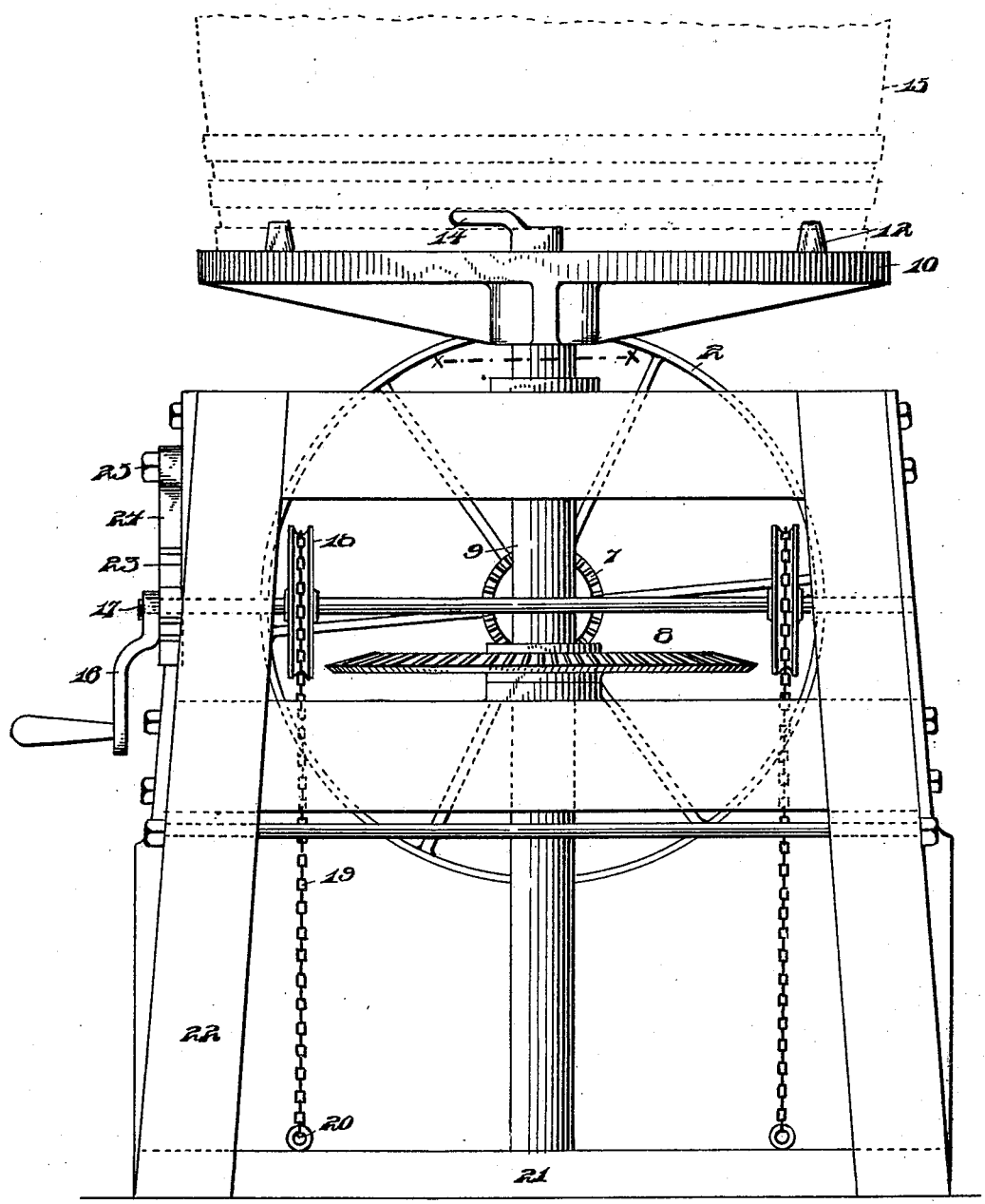

No. 689,265. Patented Dec. 17, 1901.
C. G. WIELAND.
MACHINE FOR PAINTING BARRELS.
(Application filed Sept. 13, 1901.)
(No Model.) 3 Sheets—Sheet 2.
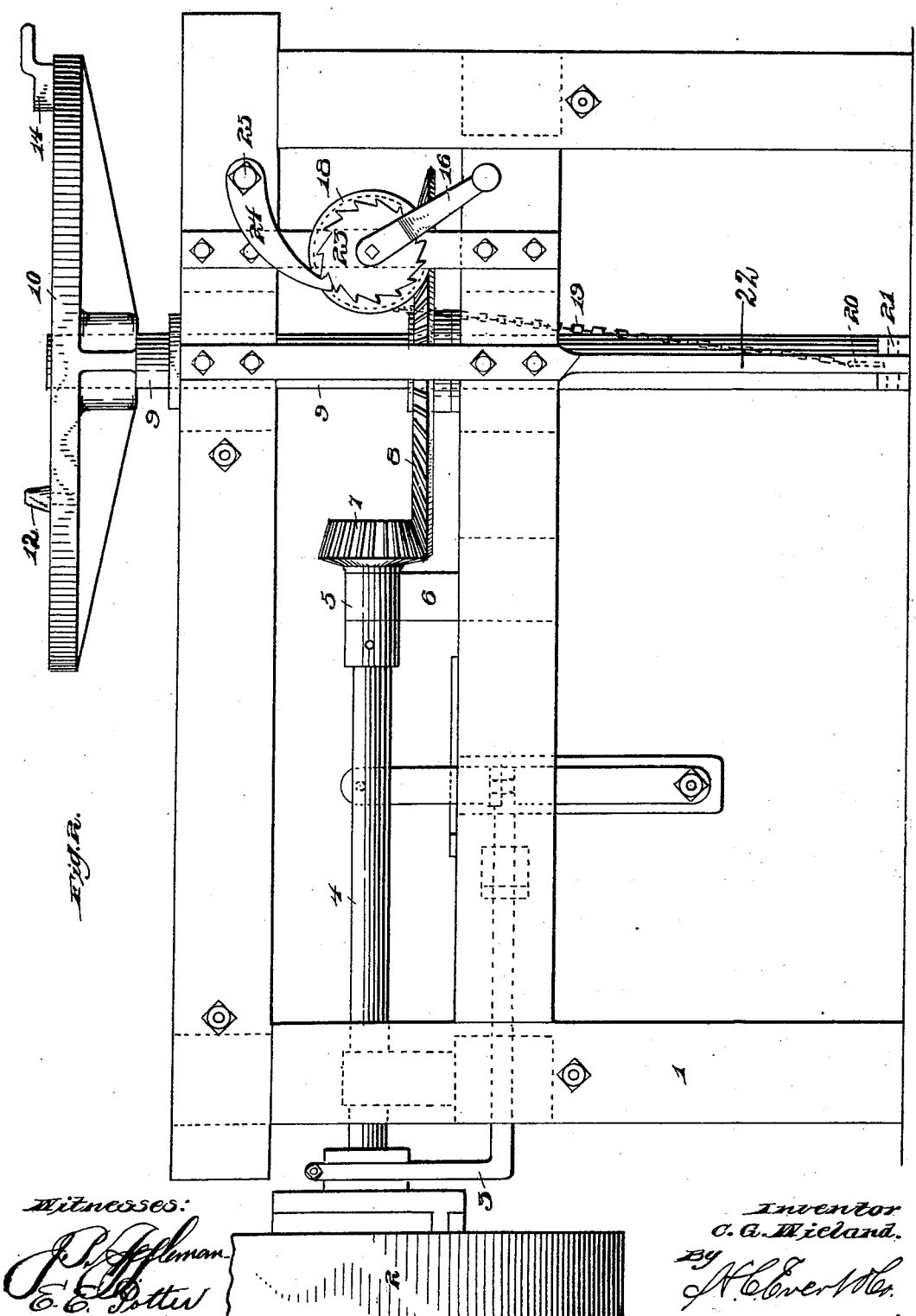

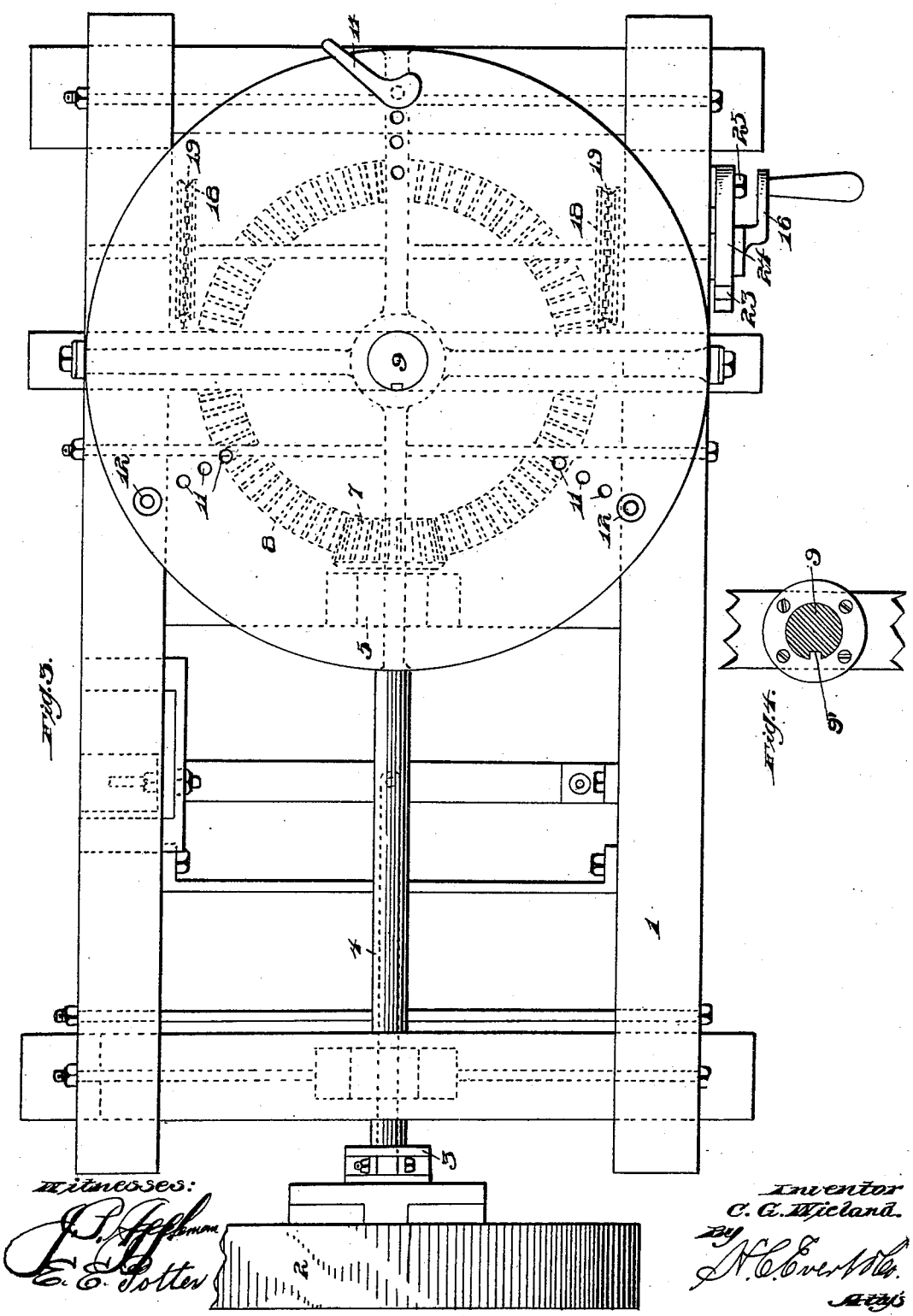

UNITED STATES PATENT OFFICE.

CHARLES G. WIELAND, OF PITTSBURG, PENNSYLVANIA.

MACHINE FOR PAINTING BARRELS.

SPECIFICATION forming part of Letters Patent No. 689,265, dated December 17, 1901.

Application filed September 13, 1901. Serial No. 75,247. (No model.)

*To all whom it may concern:*

Be it known that I, CHARLES G. WIELAND, a citizen of the United States of America, residing at Pittsburg, in the county of Allegheny and State of Pennsylvania, have invented certain new and useful Improvements in Machines for Painting Barrels and the Like, of which the following is a specification, reference being had therein to the accompanying drawings.

This invention relates to certain new and useful improvements in machines for painting barrels and the like, and has for its object the provision of novel means whereby a barrel or vessel may be easily clamped to a turn-table, means whereby said turn-table is rotated, and means to raise and lower said turn-table to any desired height.

The invention has for a further object to construct a machine of the above-described character that will be extremely simple in construction, strong, durable, and comparatively inexpensive to manufacture; furthermore, one that will be highly efficient in its operation.

With the above and other objects in view the invention consists in the novel combination and arrangement of parts to be hereinafter more fully described, and specifically pointed out in the claim.

In describing the invention in detail reference is had to the accompanying drawings, forming a part of this specification, and wherein like numerals of reference indicate corresponding parts throughout the several views, in which—

Figure 1 is a front view of my improved machine. Fig. 2 is a side elevation thereof. Fig. 3 is a plan view of the same. Fig. 4 is a horizontal view through lines X X, Fig. 1, showing the keyway in shaft 9.

In the drawings the reference-numeral 1 indicates the frame of the machine, and 2 represents the driven pulley.

The reference-numeral 3 indicates a friction-clutch, and 4 a driving-shaft, said driving-shaft passing through the frame of the machine and carrying a collar 5, mounted adjacent to the bearing 6. To the end of said shaft 4 is fastened a beveled gear-wheel 7, meshing with the horizontally-arranged gear-wheel 8, the latter being keyed upon a vertical shaft 9, passing upwardly through the frame of the machine, to which is secured the turn-table 10. The shaft 9 is provided throughout its entire length with a keyway 9', which engages the key carried by bevel-gear 8. Thus shaft 9 can be raised and lowered at will without causing its rotation to cease. In the upper face of said turn-table are formed a series of openings 11 and pins 12. In one of said openings 11 are also removably secured cam-levers 14, serving to engage and clamp the barrel 15 in position upon the turn-table.

The reference-numeral 16 represents a crank operating the shaft 17, extending through the frame of the machine, and upon said shaft are secured pulley-wheels 18, having chains 19 attached thereto, the lower end of said chains 19 being connected at 20 to a movable support 21, upon which the shaft 9 is secured.

The reference-numeral 21 represents a support operating in the guideways 22, formed in the frame of the machine. Upon the shaft 17 is also mounted a ratchet-wheel 23, engaging the gravity-pawl 24, which is pivoted at 25 to the frame of the machine.

The operation of my improved machine is as follows: The driven pulley 2, communicating movement to the shaft 4, rotates the beveled cog-wheel 7, meshing with the cog-wheel 8, and will rotate the shaft 9, which will in turn operate the turn-table 10, carrying the barrel or vessel. As the barrel or vessel is rotated it may be easily painted, as will be readily understood. When it is desired to raise or lower the turn-table, the crank 16 is operated, winding up the chains 19 upon the pulley-wheels 18 and raising the movable support 21, together with the keyed shaft 9, raising the turn-table to the desired height. The gravity-pawl 24, engaging the ratchet-wheel, will serve to retain the shaft and turn-table in a raised position. When it is desired to lower the turn-table, the gravity-pawl is released, and the turn-table, shaft, and movable support may be lowered by gravity.

The many advantages obtained by the use of my improved device will be readily apparent from the foregoing description taken in connection with the accompanying drawings.

It will be noted that various changes may be made in the details of construction without departing from the general spirit of my invention.

Having fully described my invention, what I claim as new, and desire to secure by Letters Patent, is—

In a machine for painting barrels and the like, a frame having a horizontally-arranged shaft therein, a vertical shaft connected to said horizontal shaft, a table carried by the vertical shaft, a pair of guideways formed in said frame one on each side thereof, a support vertically movable in said guideways, said vertical shaft being rotatably mounted on said support, said vertical shaft having a keyway therein extending the entire length thereof, a bevel cog-wheel mounted on said shaft and carrying a key for engagement in said keyway of the shaft, a shaft carrying a pair of wheels, chains connected to said wheels and said support, and means for operating said shaft, substantially as described.

In testimony whereof I affix my signature in the presence of two witnesses.

CHAS. G. WIELAND.

Witnesses:
JOHN NOLAND,
E. E. POTTER.